United States Patent
Krejan et al.

[15] 3,665,649
[45] May 30, 1972

[54] APPARATUS FOR GRINDING OF ROD-SHAPED WORKPIECES

[72] Inventors: Friedhelm Krejan; Ferdinand Beese, both of Mulheim-Ruhr; Hans Hüfner, Essen-West; Franz Riedel, Solingen; Rainer Holzmann, Dinslaken, all of Germany

[73] Assignee: Th. Kieserling & Albrecht, Solingen, Germany

[22] Filed: July 30, 1969

[21] Appl. No.: 846,201

[30] Foreign Application Priority Data

June 29, 1968 Germany ................P 17 52 659.9

[52] U.S. Cl. ................................51/137, 51/148
[51] Int. Cl. .................................B24b 21/00
[58] Field of Search ...................51/137, 135, 148, 90

[56] References Cited

UNITED STATES PATENTS

| | | | |
|---|---|---|---|
| 2,383,927 | 8/1945 | Carlson | 51/90 X |
| 3,149,440 | 9/1964 | Maguire | 51/90 |
| 3,451,174 | 6/1969 | Schaller | 51/148 |
| 3,524,284 | 8/1970 | Means | 51/148 X |

*Primary Examiner*—James L. Jones, Jr.
*Attorney*—Michael S. Striker

[57] ABSTRACT

Grinding or polishing apparatus for rod-shaped metallic workpieces which issue from the rotary head of a shaving machine comprises a driven disk-shaped holder whose hub defines a passage for workpieces which leave the shaving head, an endless grinding or polishing belt which is adjustably mounted on the holder, and an electric motor which drives the belt and is mounted directly on the holder. The tensioning pulley for the belt is adjustable to enable the apparatus to treat workpieces of different diameters as well as to move the belt away from the path of cylindrical leading ends of successive workpieces.

3 Claims, 4 Drawing Figures

APPARATUS FOR GRINDING OF ROD-SHAPED WORKPIECES

BACKGROUND OF THE INVENTION

The present invention relates to apparatus for removing material from external surfaces of elongated metallic workpieces, particularly from external surfaces of solid cylindrical or tubular mandrels which move lengthwise. Still more particularly, the invention relates to improvements in grinding and/or polishing apparatus wherein the material removing element is a driven endless belt which orbits about axially advancing workpieces.

Machines for the production of seamless metallic tubes often employ elongated cylindrical mandrels which are withdrawn from freshly rolled or otherwise formed metallic tubes and whose external surfaces must be subjected to at least some treatment prior to repeated use in the production of such tubing. As a rule, the external surfaces of mandrels are treated in shaving machines which remove some of their material. However, the tool or tools of the shaving machine normally leave some traces (grooves or ridges) and such unevennesses are particularly undesirable when a mandrel is thereupon used for the production of thin-walled tubing. It was found that the grooves or ridges cause the formation of cracks. It is therefore customary to subject a freshly shaved mandrel to a secondary treatment, for example, to the action of smoothing tools to reduce the depth or height of grooves or ridges. However, even such secondary treatment of mandrels does not always prevent the formation of cracks in thin-walled seamless tubes. Therefore, manufacturers of seamless tubing presently prefer to subject mandrels to a shaving and thereupon to a precise grinding and/or polishing treatment.

Combined grinding and shaving machines are already utilized in connection with treatment of metallic wire. In such machines, the shaving unit is located ahead of the grinding unit. The latter includes a revolving head which carries several grinding disks which are biased by springs radially inwardly toward the path of wire. A drawback of such grinding units is that a satisfactory surface finish can be achieved only if the revolving head carries a large number of grinding disks, namely, grinding disks which are disposed lengthwise along the path of the advancing workpiece whereby the grinding unit contributes substantially to an increase in the overall length of the combined shaving and grinding machine. Reference may be had, for example, to U.S. Pat. No. 2,394,381. The grinding units of such machines cannot be used in machines for shaving of mandrels or analogous rod-shaped metallic workpieces because the machine would have to be provided with separate transporting means to advance workpieces through the grinding unit.

It is also known to shave mandrels or like workpieces by means of an endless belt which is mounted on a revolving disk and is driven in response to rotation of the disk about its axis. A drawback of such proposal (see German Pat. No. 457,663) is that the speed of the belt cannot be regulated or selected independently of the speed of the disk, that the disk cannot be rotated without driving the belt and that, of course, the belt cannot be driven if the disk is idle. This limits the usefulness of such apparatus.

Certain other conventional proposals are disclosed in German Pat. No. 1,087,929 and in German DAS No. 1,181,092.

SUMMARY OF THE INVENTION

An object of the invention is to provide a novel and improved grinding and/or polishing apparatus for rod-shaped metallic workpieces which can be installed in presently known shaving machines, which is capable of grinding and/or polishing workpieces of different diameters as well as workpieces with cylindrical or conical leading ends, and which is simpler, more compact and less prone to malfunction than presently known apparatus.

Another object of the invention is to provide a grinding and/or polishing apparatus which need not be provided with its own transporting means for workpieces and which is constructed in such a way that it can be installed in many presently known rod shaving machines without necessitating any appreciable alterations in the design and/or mode of operation of such machines.

A further object of the invention is to provide the apparatus with novel means for mounting, driving and adjusting its endless material removing belt.

An additional object of the invention is to provide an apparatus whose operation can be controlled by hand or automatically, preferably in synchronism with transport of workpieces therethrough, and which contributes very little or not at all to the overall length of a shaving machine in which the apparatus is put to use.

Still another object of the invention is to provide a grinding and/or polishing apparatus which can be rapidly converted from treatment of workpieces with cylindrical leading ends to treatment of workpieces with differently configurated leading ends, or vice versa.

The grinding apparatus of our invention comprises a housing or main support which can be installed in or on the frame of a shaving machine, preferably between the revolving shaving head and the withdrawing mechanism of such machine. It comprises a holder which is rotatably mounted in the support and defines an axially extending passage for freshly shaved workpieces which move lengthwise under the action of one or more clamping or gripping devices forming part of the aforementioned withdrawing mechanism, an endless material removing belt mounted on the holder and arranged to engage the surfaces of moving workpieces, and drive means for driving the belt, including prime mover means mounted directly on and rotating with the holder. Such prime mover means preferably comprises an electric motor whose output shaft is directly coupled to the shaft of the driver pulley for the belt and which receives current from an external energy source by way of conductors mounted in or on the support, preferably by way of a set of slip rings.

The novel features which are considered as characteristic of the invention are set forth in particular in the appended claims. The improved grinding apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
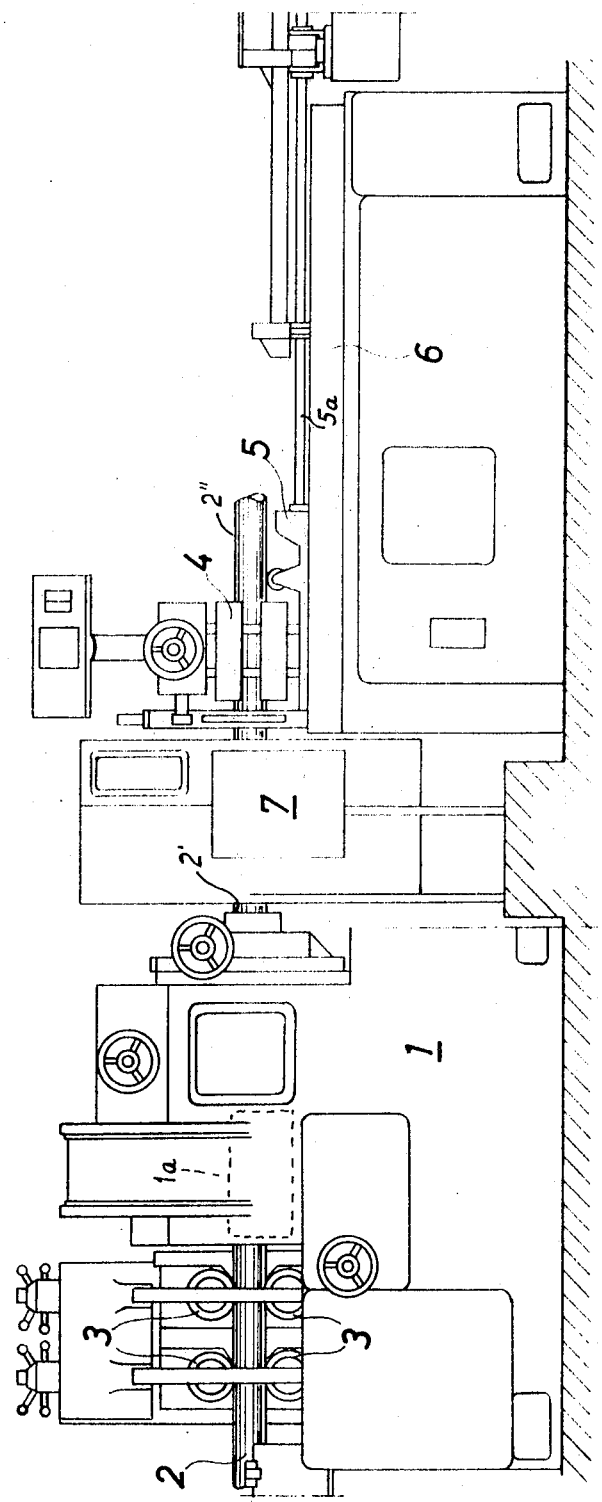
FIG. 1 is a schematic side elevational view of a shaving machine for metallic rod-shaped workpieces which includes a grinding apparatus embodying one form of our invention.

FIG. 1 illustrates a shaving machine for tubular or solid cylindrical metallic workpieces 2. The machine comprises a frame 1 which accommodates a rotary shaving head 1a of known design. The feeding unit which transports workpieces 2 toward, through and beyond the shaving head 1a in the frame 1 comprises driven rolls 3. The withdrawing unit which engages and transports shaved workpieces 2' downstream of the shaving head 1a comprises gripping members or claws 4 which are mounted on a reciprocable slide or carriage 5. The latter either slides or rolls (with its wheels) along a base or bed 6 of the frame 1 and is movable back and forth by the piston rod 6a of a double-acting hydraulic cylinder, not shown. The heretofore described parts by themselves form no part of the present invention. The invention resides mainly in the provision of a grinding and/or polishing apparatus which comprises a main support or housing 7 installed between the shaving head 1a and the carriage 5. The driven endless belt 11 (FIG. 2) of the grinding apparatus in the housing 7 treats the shaved workpieces 2' immediately after they advance beyond the shaving head 1a.

Figure 2:
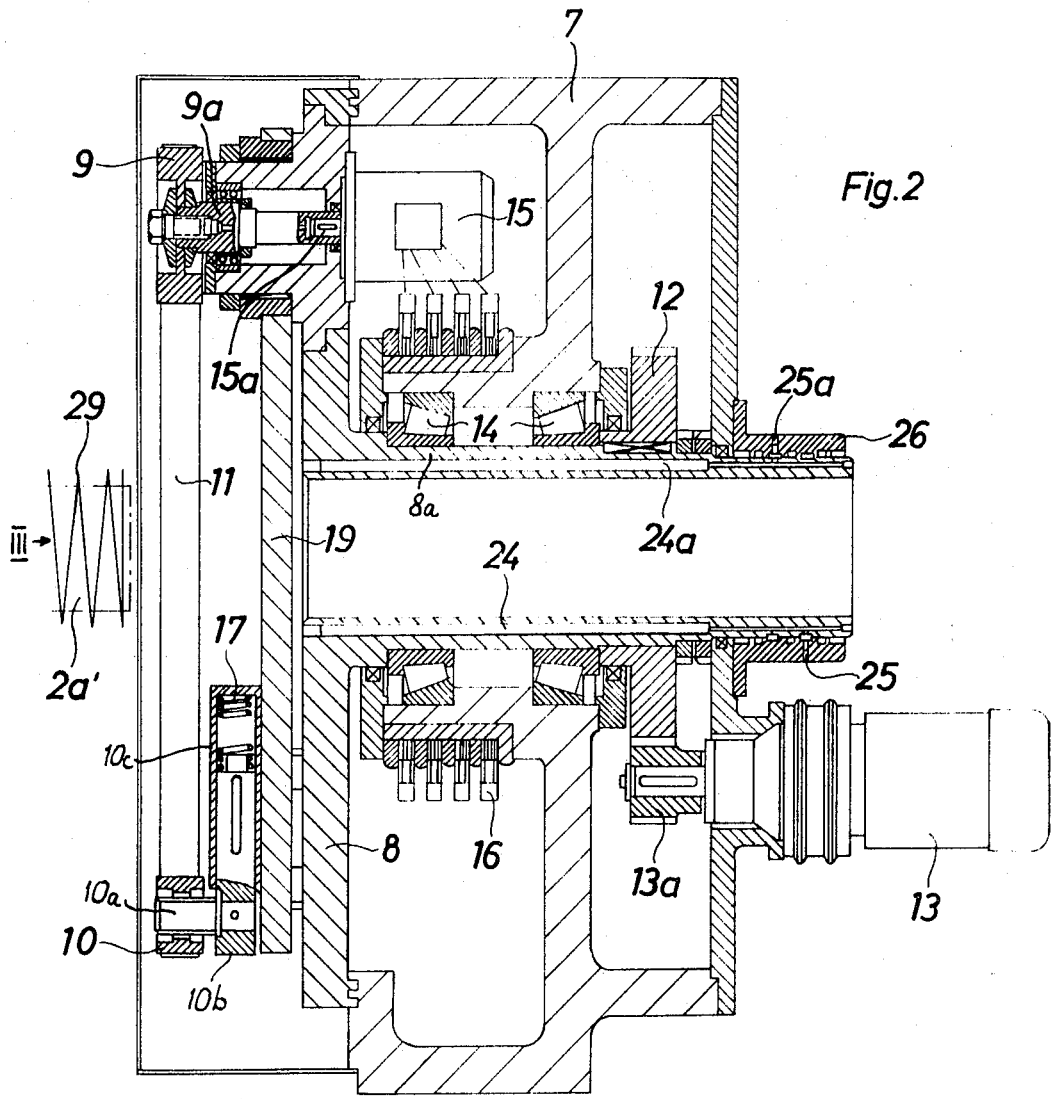
FIG. 2 is an enlarged axial sectional view of the grinding apparatus shown in FIG. 1.

As shown in FIG. 2, the housing 7 accommodates a rotary disk-shaped holder 8 which comprises a hollow extension or hub 8a coaxial with the shaving head 1a and having a bore whose diameter exceeds the diameter of shaved workpieces 2'. The holder 8 supports a driver pulley 9 and a tensioning pulley 10 for the endless belt 11. The means for rotating the holder 8 about the axis of its hub 8a comprises a driven gear 12 fixed to the hub 8a, a prime mover here shown as a variable speed electric motor 13 which is mounted externally on the housing 7, and a driver gear 13a which is fixed to the output shaft of the motor 13 and mates with the gear 12. The hub 8a rotates in roller bearings 14 which are installed in the housing 7.

The holder 8 further serves to support a second prime mover here shown as a variable speed electric motor 15 which can rotate the driver pulley 9 independently of the motor 13, i.e., the speed of the holder 8 can be adjusted and selected independently of the speed of the belt 11. The output shaft 15a of the motor 15 is directly coupled to the shaft 9a of the driver pulley 9. The means for connecting the motor 15 in circuit with a source of electrical energy (not shown) comprises a set of slip rings 16 mounted in the casing 7.

Figure 3:
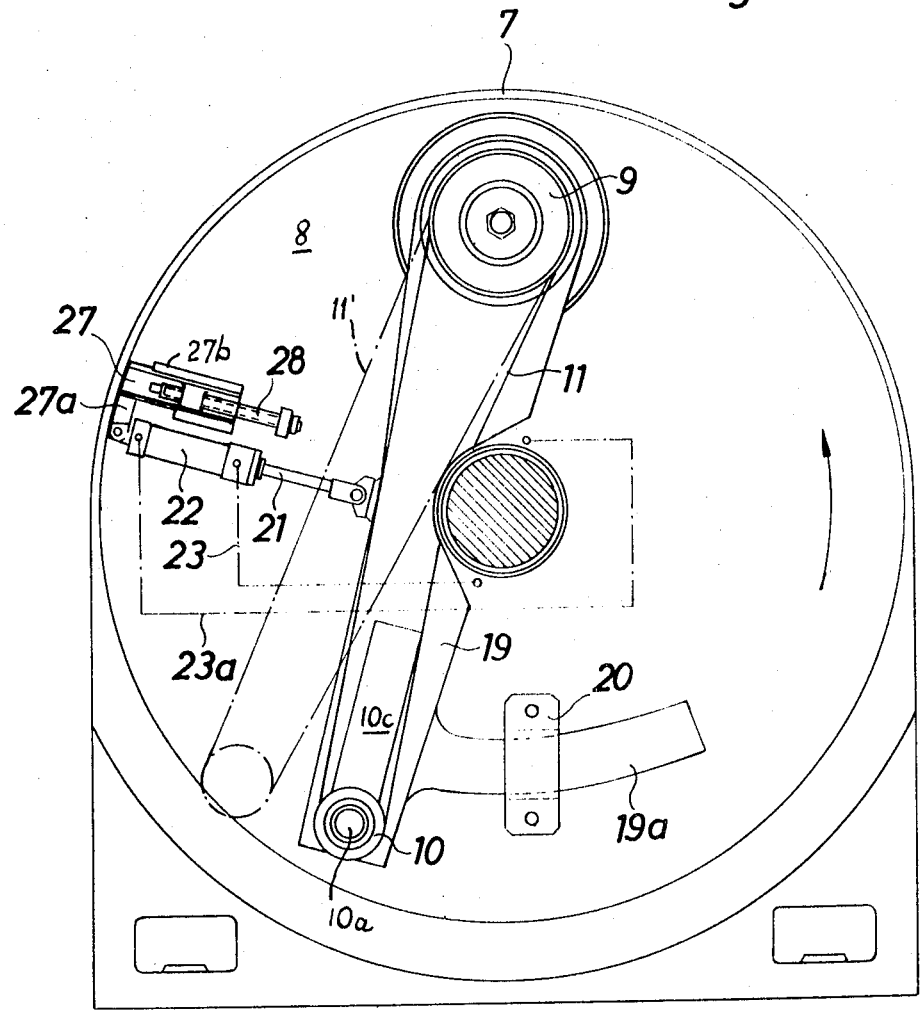
FIG. 3 is an end elevational view substantially as seen in the direction of arrow III of FIG. 2.

The tensioning pulley 10 is mounted on a shaft 10a which is secured to a plunger 10b received in a cylinder 10c and biased away from the pulley 9 by a prestressed helical spring 17. The arrangement is such that the bias of the spring 17 is assisted by centrifugal force when the holder 8 is driven by the motor 13. When the belt 11 is used for grinding or polishing the external surfaces of cylindrical workpieces 2' (namely, of cylindrical workpieces whose leading ends or tips 2a' are also cylindrical shape), the tensioning pulley 10 and the parts 10a–10c, 17 are mounted on a carrier or lever 19 in a manner as shown in FIGS. 2 and 3. The lever 19 is turnable about the axis of the driver pulley 9 and has an arcuate projection or arm 19a whose center of curvature is located on the axis of the pulley 9. The arm 19a is guided in a bracket 20 which is affixed to the holder 8 so that the lever 19 can pivot about the axis of the pulley 9. The means for pivoting the lever 19 comprises a double-acting hydraulic or pneumatic cylinder 22 which is adjustably mounted on the holder 8 and has a piston rod 21 articulately coupled to a median portion of the lever 19. The means for supplying a pressure medium to and for evacuating pressure medium from the chambers of the double-acting cylinder 22 comprises conduits 23, 23a which communicate with axially parallel bores 24, 24a of the holder 8 (see particularly FIG. 2), circumferential grooves 25, 25a provided in a stationary sleeve 26 which is adjacent to the end of the hub 8a and is affixed to the casing 7, and preferably solenoid-operated valves (not shown) which regulate the admission and evacuation of pressure medium from the grooves 25, 25a. The grooves 25, 25a respectively communicate with the bores 24, 24a in each angular position of the holder 8. The aforementioned valves can be manipulated by hand or in automatic response to lengthwise travel of workpieces 2' toward, through and beyond the holder 8. The double-acting cylinder 22 is fixed to a projection 27a of a slide 27 which is mounted in ways 27b of the holder 8 and is movable radially of the holder by a feed screw 28. The parts 27, 28 serve as a means for selecting the initial position of the belt 11 (shown in FIG. 3 by solid lines) as a function of the diameters of workpieces 2'. The purpose of the double-acting cylinder 22 is to move the belt 11 away from the path of advancing workpieces 2' when the cylindrical leading end 2a' of a workpiece approaches the grinding apparatus. Thus, the piston rod 21 of the cylinder 22 can move the belt 11 between the solid-line position and the phantom-line position 11' of FIG. 3. The solid-line position of the belt 11 is selected by the feed screw 28 and slide 27.

FIG. 2 illustrates an induction coil 29 which forms part of an oscillating circuit and serves to actuate the aforementioned valves which control the flow of a pressure medium to and from the chambers of the cylinder 22. The inductance of the coil 29 changes when it is approached by the leading end 2a' of a fresh workpiece 2' whereby the oscillating circuit is unbalanced and produces a signal which is amplified and transmitted to the relay means for the solenoid valves to effect movement of the belt 11 first to the phantom-line position 11' and thereupon to the solid-line position of FIG. 3. In this way, the leading end 2a' cannot damage the belt and the latter automatically engages the peripheral surface of the workpiece 2' as soon as the front face of the leading end 2a' cannot interfere with return movement of the belt to the solid-line position. An oscillating circuit which can be used in the grinding apparatus of FIGS. 1 to 3 to serve as a contactless initiator for energization and deenergization of solenoids of valves which control the flow of pressure medium to and from the chambers of the cylinder 22 is described, for example, in German Utility Model No. 1,885,761.

Figure 4:
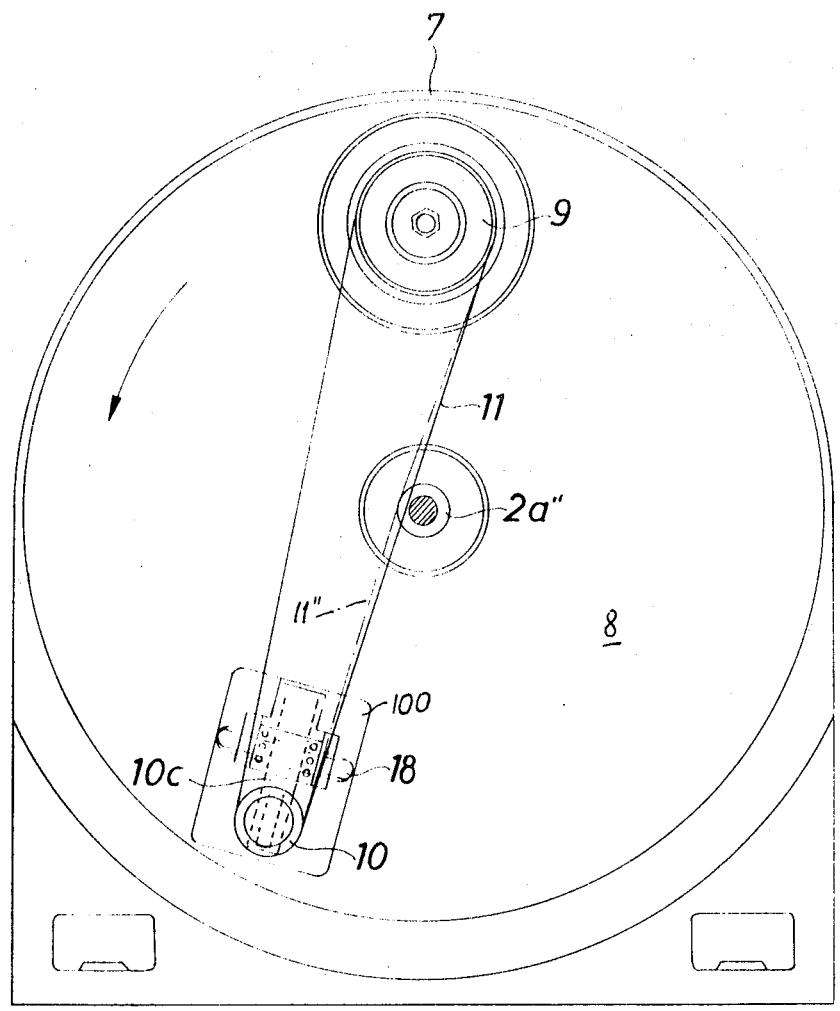
FIG. 4 is a similar end elevational view of a slightly modified grinding apparatus.

FIG. 4 illustrates a portion of a simplified grinding and/or polishing apparatus wherein the lever 19 is not needed because the leading end 2a'' of a freshly shaved workpiece is of frustoconical shape. Therefore, the conical surface of the leading end 2a'' can properly engage and cannot damage the belt 11 when the workpiece moves lengthwise and its end 2a'' enters the grinding station. The tensioning pulley 10 and the cylinder 10c are mounted on a bracket or support 100 which is movable along an arcuate guide groove or slot 18 provided therefor in the holder 8. The bracket 100 can be fixed in any one of a large number of different positions to properly locate the belt 11 with reference to workpieces of different diameters. When the right-hand stretch of the belt 11 is engaged by the conical surface of a leading end 2a'', such stretch is deflected to assume the phantom-line position 11''.

An important advantage of our grinding apparatus is that the prime mover 15 for the belt 11 is mounted directly on and shares rotary movements of the holder 8. This reduces the number of parts because the prime mover 15 can be connected with the energy source in a simple and space-saving manner, i.e., by conductors in the form of slip rings 16. Another important advantage of the apparatus is that its housing 7 occupies little room so that it can be readily installed in the space between the shaving head 1a and withdrawing mechanism 4, 5, 5a of a conventional shaving machine. This brings about the additional important advantage that the apparatus need not be provided with its own work transporting means, i.e., the mechanism including the parts 4, 5, 5a can readily move freshly shaved workpieces lengthwise through the passage defined by the hub 8a and past the station which accommodates the belt 11.

The workpieces 2 can constitute the aforediscussed mandrels which must be shaved prior to renewed use in a machine for the production of seamless tubes or the like.

Without further analysis, the foregoing will so fully reveal the gist of the present invention that others can, by applying current knowledge, readily adapt it for various applications without omitting features which fairly constitute essential characteristics of the generic and specific aspects of our contribution to the art.

What is claimed as new and desired to be protected by Letters Patent is set forth in the appended claims

We claim:

1. Grinding apparatus, particularly for removing material from external surfaces of freshly shaped metallic rod-shaped workpieces which move lengthwise, comprising a support; a holder rotatably mounted on said support and defining a passage for moving workpieces; an endless material removing belt mounted on said holder and arranged to engage the surfaces of moving workpieces; and drive means for driving said belt and comprising prime mover means mounted on and sharing rotary movement of said holder, a driver pulley operatively connected with said prime mover means and rotatably mounted on said holder, a tensioning pulley remote from said driver pulley, said belt being trained over said pulleys, and mounting means adjustably mounting said tensioning pulley on said holder and comprising a lever pivotable with reference to said holder about the axis of said driver pulley and means for pivoting said lever with reference to said holder.

2. Grinding apparatus as defined in claim 1, wherein the means for pivoting said lever comprises double-acting fluid operated cylinder means.

3. Grinding apparatus as defined in claim 2, further comprising means for adjustably mounting said cylinder means on said holder.

* * * * *